(No Model.)
W. J. BREWER.
ANTI FRICTION BEARING FOR SHAFTS.
No. 384,506. Patented June 12, 1888.
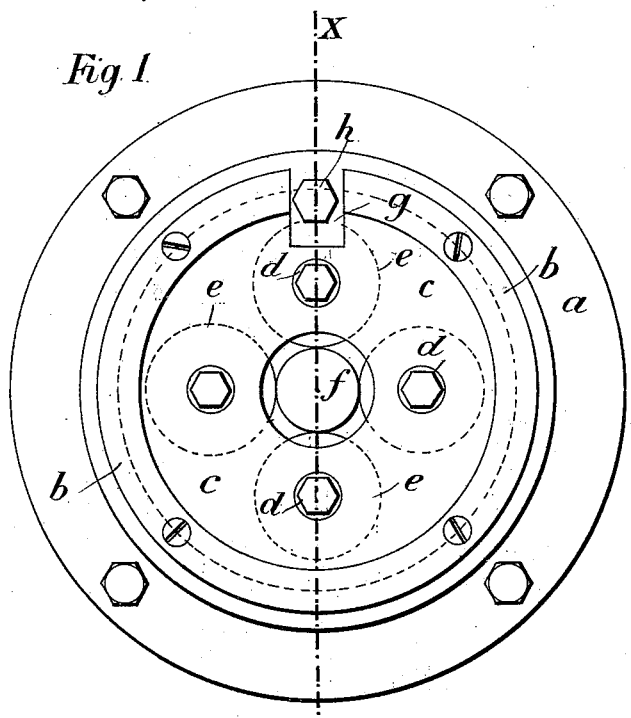
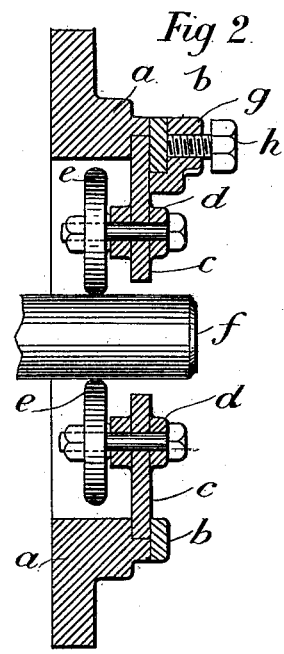
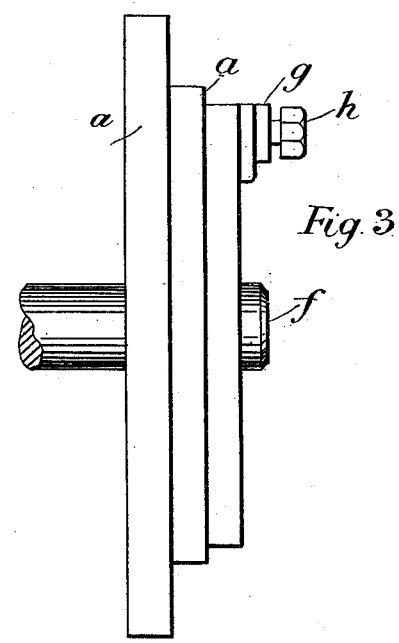
WITNESSES,
J. A. Hurdle.
Chas. Amon,
INVENTOR,
William J. Brewer
By James H. Lancaster.
Attorney

UNITED STATES PATENT OFFICE.

WILLIAM J. BREWER, OF LONDON, COUNTY OF MIDDLESEX, ENGLAND.

ANTI-FRICTION BEARING FOR SHAFTS.

SPECIFICATION forming part of Letters Patent No. 384,506, dated June 12, 1888.

Application filed October 11, 1887. Serial No. 252,077. (No model.)

*To all whom it may concern:*

Be it known that I, WILLIAM JOHN BREWER, a subject of the Queen of Great Britain, and a resident of London, in the county of Middlesex, England, have invented certain new and useful Improvements in Anti-Friction Bearings for Rotary Shafts, of which the following is a full, clear, and exact specification thereof.

My invention relates to anti-friction bearings for rotary shafts of dynamo-electric machines, and also for other rotary shafts where a reduction of friction is necessary.

My invention consists of two or more rollers mounted on an adjustable frame adapted to be moved around the armature-shaft of a dynamo-electric machine, said adjustable frame held within guides forming a part of the gudgeon, bolted or otherwise secured to the polar portion of the machine.

Figure 1 represents a face view of the journal-box provided with the anti-friction rollers. Fig. 2 is a vertical section thereof, taken on line *x x*. Fig. 3 is a side elevation.

Similar letters refer to similar parts throughout the drawings, in which—

*a* represents the gudgeon, provided with the guide or guard *b*, the latter of which is adapted to hold the adjustable plate *c*, provided with washers *d*, for the reception of the pintles or shafts of the anti-friction rollers *e*, the latter of which is adapted to support the armature-shaft *f*. The face of the adjustable plate *c* is provided with the screw-threaded lug *g*, for the reception of the set-screw *h*.

Having thus described my invention, what I claim as new, and desire to secure by Letters Patent, is—

The combination, substantially as shown and described, consisting of the gudgeon or journal-box *a*, the adjustable plate connected therewith, the washers *d*, the anti-friction rollers arranged in said adjustable plate, the armature-shaft *f*, screw-threaded lug *g*, and set-screw *h*.

In testimony that I claim the foregoing I have hereunto set my hand this 10th day of August, 1887.

WILLIAM J. BREWER.

Witnesses:
JULIAN A. HURDLE,
D. M. SEAMAN.